US006829600B2

(12) United States Patent
Gu et al.

(10) Patent No.: US 6,829,600 B2
(45) Date of Patent: Dec. 7, 2004

(54) MERGE DELETE STATEMENT FOR DATABASE OPERATIONS

(75) Inventors: Richard Y. Gu, Mountain View, CA (US); Harmeek S. Bedi, Foster City, CA (US); Ashish Thusoo, Foster City, CA (US)

(73) Assignee: Oracle International Corporation, Redwood Shores, CA ( * ) Notice: Subject to any disclaimer, the term of this patent is extended or adjusted under 35 U.S.C. 154(b) by 32 days.

(21) Appl. No.: 10/407,713

(22) Filed: Apr. 3, 2003

(65) Prior Publication Data

US 2004/0199519 A1 Oct. 7, 2004

(51) Int. Cl.[7] .............................................. G06F 17/30
(52) U.S. Cl. ............................................... 707/3; 707/2
(58) Field of Search .............................. 707/1, 2, 3, 4, 707/5, 6, 7, 8, 9, 10, 101, 102, 104.1, 200, 201, 202, 203

(56) References Cited

U.S. PATENT DOCUMENTS

| | | | | |
|---|---|---|---|---|
| 5,706,494 A | * | 1/1998 | Cochrane et al. | 707/2 |
| 6,356,901 B1 | * | 3/2002 | MacLeod et al. | 707/6 |
| 6,453,314 B1 | * | 9/2002 | Chan et al. | 707/3 |
| 6,636,846 B1 | * | 10/2003 | Leung et al. | 707/2 |
| 6,768,986 B2 | * | 7/2004 | Cras et al. | 707/2 |

OTHER PUBLICATIONS

Oracle Corporation, "Oracle9i Database Daily Feature, MERGE Statement," published Sep. 17, 2002, 3 pages.
Shirinne Alison, et al., Oracle Corporation, "Oracle9i Warehouse Builder, User's Guide," Release 9.0.3, Mar. 29, 2002, Part No. A97306–01, 35 pages.

* cited by examiner

Primary Examiner—Diane D. Mizrahi
Assistant Examiner—Yicun Wu
(74) Attorney, Agent, or Firm—John D. Henkhaus; Hickman Palermo Truong & Becker (57) ABSTRACT

Conditional functionality is provided for database merge operations. A merge operation, for merging data from a source to a destination, involves performing a default operation for each source record. Default operations associated with a MERGE statement include UPDATE and INSERT operations. Which default operation is performed depends on whether any destination record corresponds to a given source record. In an embodiment, whether a specified condition is satisfied is determined. If the condition is satisfied, then the default operation that is appropriate for a given source record is performed. If the condition is not satisfied, then the given source record is processed without performing the appropriate default operation. In one aspect, the UPDATE clause of the MERGE statement is extended to include a conditional DELETE clause. Hence, records are deleted as appropriate based on a temporary updated state, as part of the same process as the update operation, without an additional table scan and without having to first update the record in shared memory or in persistent storage.

34 Claims, 4 Drawing Sheets

MERGE DELETE STATEMENT FOR DATABASE OPERATIONS

FIELD OF THE INVENTION

The present invention relates generally to database operations and management and, more specifically, to a MERGE DELETE statement for database queries.

BACKGROUND OF THE INVENTION

In a data warehouse environment, tables need to be refreshed periodically with new data arriving from client systems. The new data may contain changes to existing records, i.e., rows in tables, of the warehouse and/or new records that need to be inserted.

Historically, the update and insert operations associated with a data refresh event were expressed according to one of two approaches: either (1) as a sequence of DMLs (INSERT and UPDATE operations) or (2) as PL/SQL loops that determine, for each record, whether to insert or update data. Both approaches face performance obstacles. The first approach requires four table scans and two table joins. That is, each of the source and destination table is scanned and the two tables joined for each of two query clauses [e.g., (1) WHERE $C_{dest}$ IN; and (2) WHERE $C_{dest}$ NOT IN]. The second approach operates on a perrecord basis.

The Oracle 9i database system introduced a database server feature that addresses needs associated with data Extraction, Transformation, and Loading (ETL), which are often encountered in the context of data warehousing. That feature is the SQL statement MERGE, which combines the sequence of conditional INSERT and UPDATE commands in a single atomic statement to merge data from a source to a destination or target (sometimes referred to as Upsert functionality). The INSERT and UPDATE commands are considered conditional in that (a) if a record in the new data corresponds to an item that already exists in the destination, then an UPDATE operation is performed on the item; and (b) if a record in the new data does not already exist in the destination, then an INSERT operation is performed to add a corresponding record to the destination.

The following is an example of the MERGE statement, in the context of a periodic update to a fact (destination) table, SALES_FACT, based on sales data coming from on-line systems (source). Further, when a new store is opened, data from the new store (source) needs to be inserted into the SALES_FACT table.

```
MERGE INTO SALES_FACT D
USING SALES_JUL01 S
ON (D.TIME_ID=S.TIME_ID
   AND D.STORE_ID=S.STORE_ID
   AND D.REGION_ID=S.REGION_ID)
WHEN MATCHED THEN
UPDATE
SET d_parts=d_parts+s_parts
   d_sales_amt=d_sales_amt+s_sales_amt,
   d_tax amt=d_tax_amt+s_tax amt,
   d_discount_amt=d_discount_amt+s_discount_amt
WHEN NOT MATCHED THEN
INSERT (D TIME_ID, D.STORE_ID, D.REGION_ID,
D.PARTS_ID, D.SALES_AMT, D.TAX_AMT,
D.DISCOUNT)
VALUES ( S.TIME_ID, S.STORE_ID, S.REGION_ID,
S.PARTS_ID, S.SALES_AMT, S.TAX_AMT,
S.DISCOUNT).
```

Using the MERGE command, the conditional INSERT or UPDATE is processed based on a single SQL statement. However, multiple table scans are required to issue the appropriate DML commands against the destination data, which is then stored persistently, such as on disk.

Often, it is desirable to cleanse the destination containers (e.g., data tables) of unneeded records as part of the overall process of populating or updating them using the MERGE statement. In order to perform a cleansing of the destination tables; a separate DELETE statement is executed after the MERGE statement has finished executing. The separate DELETE statement requires at least one additional scan of the destination table to check the condition of each relevant row and to remove rows which meet the condition. In addition, the separate DELETE operation requires additional probes into shared memory as well as additional disk I/O operations.

Based on the foregoing, there is a clear need for an improved technique for cleansing a data table in conjunction with a data merging process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A database query language extension and associated operations on a database, and query syntax enhancements, are described. The extension is referred to herein as a MERGE DELETE statement. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

In one aspect, conditional functionality is provided for database merge operations. A merge operation, for merging data from a source to a destination, involves performing a default operation for each source record. The default operation for source records that match destination records is typically to update the destination records based on the source records. The default operation for source records that do not match destination records is to insert the source record into the destination.

In an embodiment, the database server determines whether to perform the default operation during a merge operation based on whether a specified condition is satisfied. If the condition is satisfied, then the default operation that is appropriate for a given source record is performed. If the condition is not satisfied, then the given source record is processed without performing the appropriate default operation. Thus, conditional functionality is provided for each of the UPDATE and INSERT operations associated with a MERGE operation. In an embodiment, the decision about whether to perform the default operation hinges on at least one of the given source record and a corresponding destination record.

In one aspect, the UPDATE clause or portion of a MERGE statement is extended to include a conditional DELETE clause. Hence, records are deleted as appropriate based on a post-update state, as part of the same process as the update operation. Consequently, an additional table scan is avoided. In addition, when a record is deleted by virtue of the DELETE clause, the record is deleted without having to first update the record in shared memory or in persistent storage. Consequently, probing into the shared memory or disk I/O, respectively, is avoided.

A PROCESS FOR PERFORMING A MERGE OPERATION

Figure 1A:
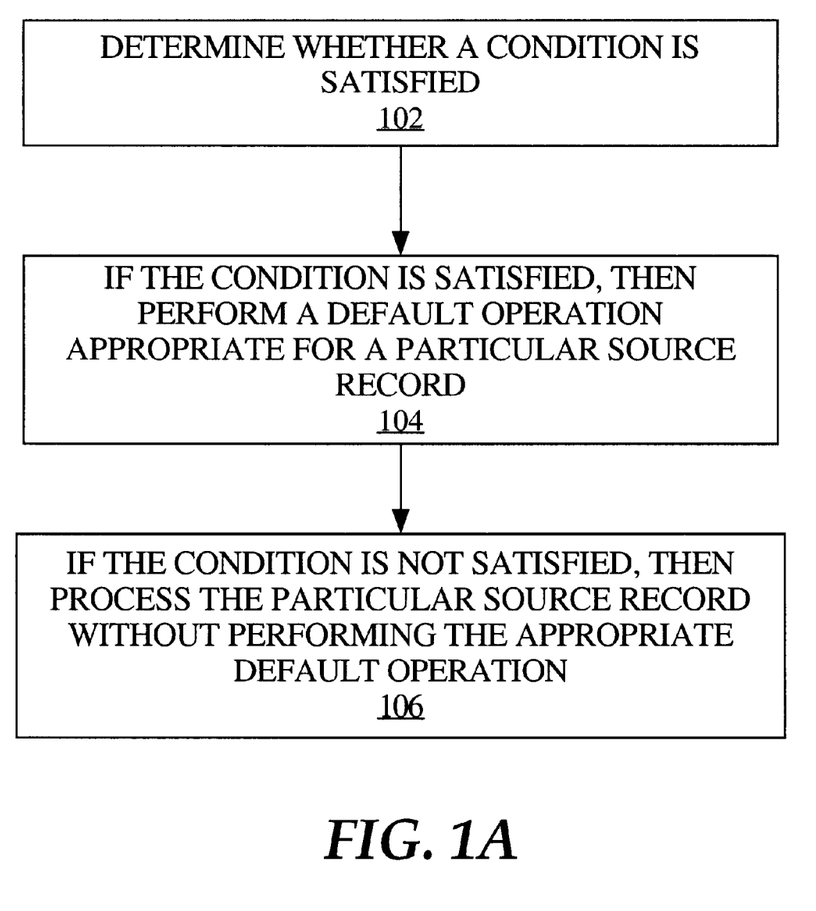
FIG. 1A is a flowchart that illustrates a process for performing a merge operation for merging data from a source to a destination.

FIG. 1A is a flowchart that illustrates a process for performing a merge operation for merging data from a source to a destination. As mentioned above, a merge operation typically involves performing a default operation for each source record. Which default operation is performed, if any, is based on whether any destination record corresponds to a given source record.

At block 102, whether a condition is satisfied is determined. In one embodiment, the condition is specified in the same query that requests the merge operation. For example, the condition may be specified in a MERGE statement of an SQL query. For other examples, (1) the condition is specified in the UPDATE clause of the MERGE statement, or alternatively, (2) the condition is specified in the INSERT clause of the MERGE statement.

In one embodiment, the determination at block 102 is based on at least one of (1) a particular source record being processed and (2) a destination record that corresponds to the particular source record. In the context of a condition associated with the INSERT default operation (i.e., a conditional INSERT), the condition is based on the particular source record. When no destination record corresponds to the source record being processed, a merge operation falls into the "WHEN NOT MATCHED" logic. Thus, a condition on a destination record is not applicable because no corresponding destination record exists. In the context of a condition associated with the UPDATE default operation (i.e., a conditional UPDATE), the condition is based on either the particular source record, the corresponding destination record, or both.

In one embodiment, the determination performed at block 102 includes retrieving destination records from persistent storage, such as from a storage disk or other high-volume storage mechanism, and temporarily storing the retrieved destination records in a shared memory buffer cache. Further, the source records are temporarily stored in the buffer cache and whether the condition is satisfied is determined based on the records in the buffer cache. In a related embodiment, the step of performing the default operation for a particular source record, when applicable, includes storing in the persistent storage a destination record that corresponds to the particular source record.

At block 104, the default operation appropriate for a particular source record is performed if the condition is satisfied. At block 106, the particular source record is processed without performing the appropriate default operation.

According to one embodiment, when there is not a destination record that corresponds to a given source record being processed, the specified condition is associated with the source record. Such embodiment is applicable, for example, in the context of a conditional INSERT. If the INSERT condition is satisfied, then a corresponding destination record is created and inserted into the destination. If the INSERT condition is not satisfied, then a corresponding destination record is not inserted.

According to one embodiment, when there is a destination record that corresponds to a given source record being processed, the specified condition may be associated with the source record or the corresponding destination record. Such embodiment is applicable, for example, in the context of a conditional UPDATE. If the UPDATE condition is satisfied, then the corresponding destination record is updated. If the UPDATE condition is not satisfied, then the corresponding destination record is not updated.

In one embodiment, conditional functionality is provided for a DELETE clause that is associated with the UPDATE operation, wherein a specified condition may be associated with the source record or the corresponding destination record. If the specified condition is satisfied, then the corresponding destination record is not updated according to the default UPDATE operation. In an embodiment, the corresponding destination record is deleted. If the specified condition is satisfied, then the corresponding destination record is updated according to the default UPDATE operation.

In a related embodiment, in the context of a conditional DELETE statement, the step of determining whether a condition is satisfied at block 102 includes updating the corresponding destination record in local memory based on the particular source record. Then, the determination is made as to whether the DELETE condition is satisfied based on the updated record in local memory. If the specified condition is satisfied, then the corresponding destination record is not updated according to the default UPDATE operation and, therefore, the temporarily updated record is not saved to persistent storage. Hence, unnecessary disk I/O is avoided, for example. Furthermore; by constraining the record update to local memory and foregoing the default update operation, unnecessary probing into a shared memory in which the destination records have been temporarily written, such as a buffer cache, is avoided.

In such a scenario, the UPDATE condition is first evaluated to determine whether it is satisfied. If it is satisfied, then the record is updated locally. Then, based on the temporarily updated state, the DELETE condition is evaluated to determine whether it is satisfied and this determination is acted upon accordingly.

Figure 1B:
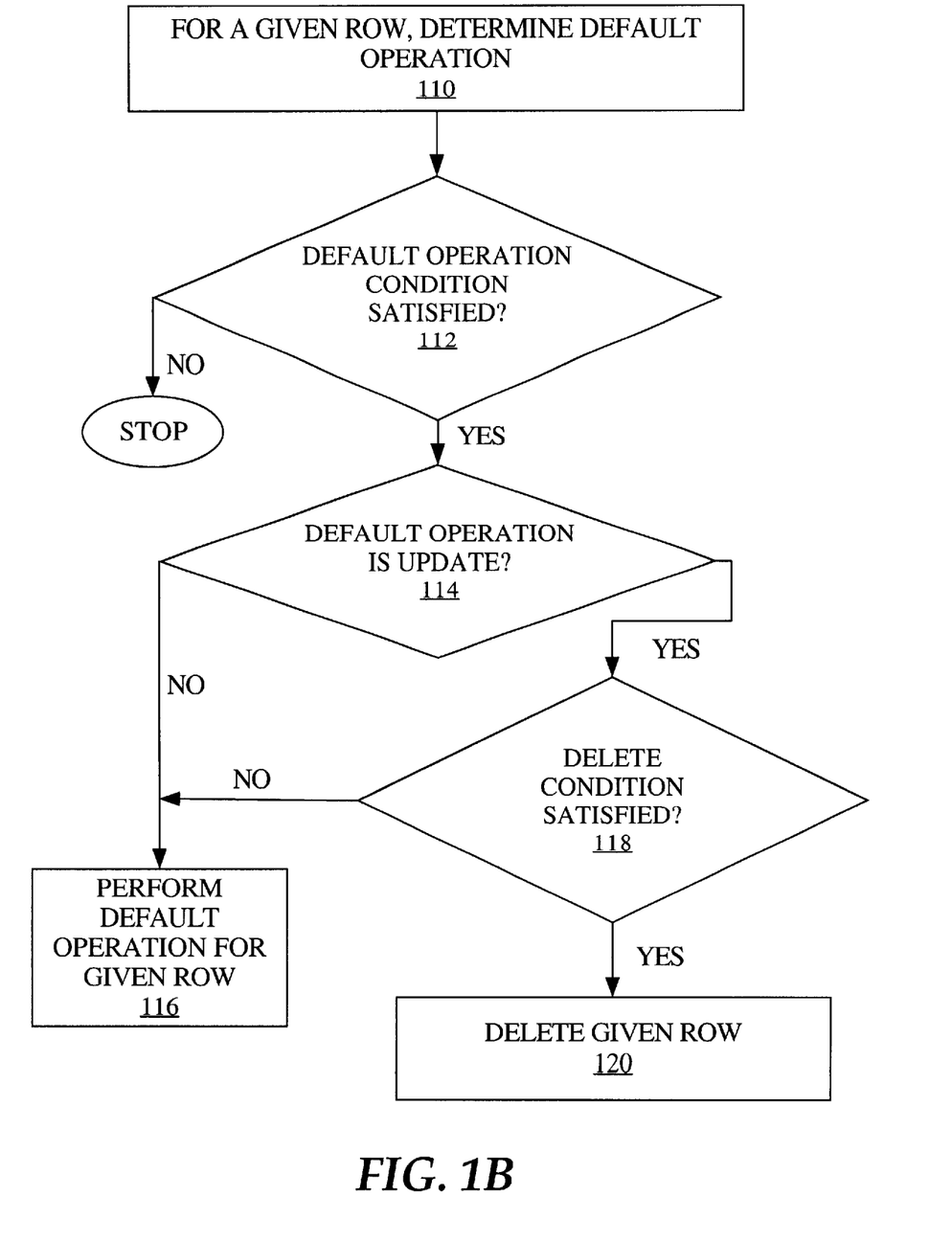
FIG. 1B is a flow diagram that illustrates an example process for merging data from a source to a destination.

FIG. 1B is a flow diagram that illustrates an example process for merging data according to techniques described herein.

At block 110, for a given row, determine what the default operation is. For example, whether the default operation is an UPDATE or an INSERT is based on whether corresponding records are found in the source and the destination. If corresponding records are found, then the default operation is an UPDATE. If corresponding records are not found, then the default operation is an INSERT.

At decision block 112, determine whether a default operation condition is satisfied. That is, determine whether a condition associated with either the UPDATE or INSERT, depending on determination at block 110, is satisfied. For example, determine whether UPDATE WHERE clause condition or INSERT WHERE clause conditions is satisfied. If the default operation condition is not satisfied at block 112, the stop the process.

If the default operation condition is satisfied, then determine, at decision block 114, whether the default operation is an UPDATE operation. If the default operation is not UPDATE, then at block 116, perform the default operation (i.e., INSERT) for the given row. For example, insert the new row, for the destination, in persistent storage or storage that will eventually be copied to persistent storage. If the default condition is UPDATE, then at decision block 118, determine whether a DELETE condition is satisfied based on a temporary update of the given record according to the UPDATE operation.

If a DELETE condition is not satisfied, then at block 116, perform the default operation (i.e., UPDATE) for the given row. For example, update the row, for the destination, in persistent storage or storage that will eventually be copied to persistent storage If the DELETE condition is satisfied, then delete the given row from persistent storage, at block 120.

A PROCESS FOR MERGING DATA FROM A SOURCE TO A DESTINATION

Figure 2:
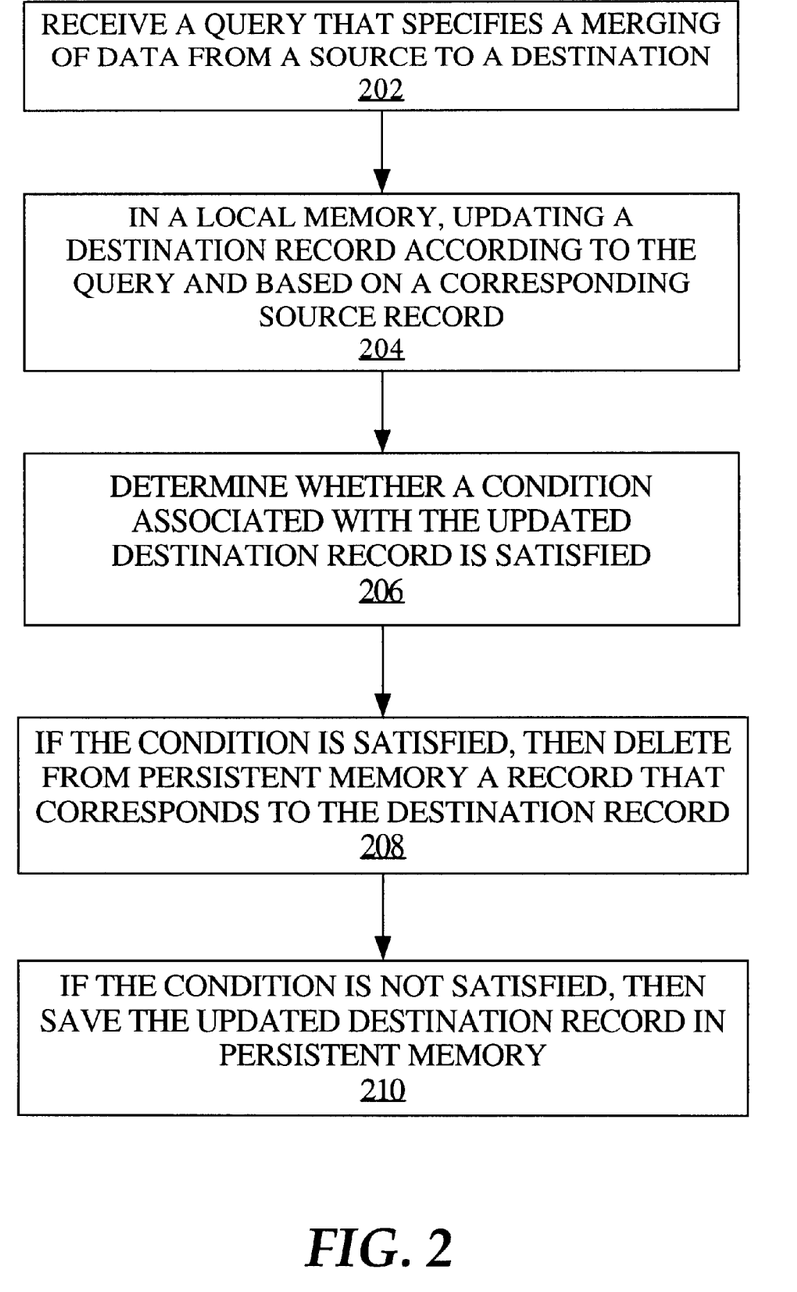
FIG. 2 is a flowchart that illustrates a process for merging data from a source to a destination.

FIG. 2 is a flowchart that illustrates a process for merging data from a source to a destination. The process of FIG. 2 illustrates the conditional DELETE functionality that is provided for a data merge operation. Thus, an applicable domain is the UPDATE portion of a MERGE statement and the related operation.

At block 202, a query is received that specifies a merging of data from a source to a destination. For an example of such a query, refer to the query described in the following sub-section. The source and destination are any type of data container, such as a relational database table or an object class.

At block 204, a destination record is updated in local memory according to the received query. In the context of a conditional DELETE, the destination record is temporarily updated according to the UPDATE clause of a MERGE statement and based on a corresponding source record. The updated record is not saved to persistent storage at this point.

At block 206, it is determined whether a condition associated with the temporarily updated destination record is satisfied. For example, a conditional DELETE clause is evaluated against the temporarily updated record to determine whether the temporarily updated state of the record meets the condition.

At block 208, if the condition is satisfied, a record in persistent memory that corresponds to the updated destination record is deleted from the persistent memory. Since the destination record, in an updated state according to the UPDATE clause, meets the condition of the DELETE clause, it is advantageous to delete the record without having to first commit the updated state to shared memory or persistent storage and without having to perform another scan of the destination or a join of the destination and the source.

At block 210, if the condition is not satisfied, then the updated destination record is saved to persistent memory.

EXAMPLE MERGE DELETE STATEMENT

An example of a MERGE DELETE query that exemplifies embodiments described herein is as follows.

MERGE INTO SALES_FACT D
USING SALES_JUL01 S
ON (D.TIME_ID=S.TIME_ID
  AND D.STORE_ID=S.STORE_ID
  AND D.REGION_ID=S.REGION_ID)
WHEN MATCHED THEN
UPDATE
SET d_parts=d_parts+s_parts,
  d_parts status=s_parts_status,
  d_sales_amt=d_sales_amt+s_sales_amt,
  d_tax_amt=d_tax_amt+s_tax_amt,
  d_discount_amt=d_discount_amt+s_discount_amt
    WHERE (D_STORE_STATE='CA')
    DELETE WHERE (D_PARTS_STATUS= 'Received')
WHEN NOT MATCHED THEN
INSERT (D.TIME_ID, D.STORE_ID, D.REGION_ID, D.PARTS, D.PARTS_STATUS, D.SALES_AMT, D.TAX_AMT, D.DISCOUNT)
  VALUES ( S.TIME_ID, S.STORE_ID, S.REGION_ID, S.PARTS, S.PARTS_STATUS, S.SALES_AMT, S.TAX_AMT, S.DISCOUNT)
  WHERE (S_SALES_AMT=>100).

As illustrated in the foregoing example query, the default operations are UPDATE and INSERT, with disjunctive applicability of the default operation based on whether a match is found with the TIME_ID, STORE_ID, and REGION_ID of a particular source record and the destination records. Whether or not the applicable default operation is performed is based on whether the relevant condition(s) is satisfied or not.

For example, if a matching record is found, then the UPDATE operation is the applicable default operation. It is determined whether the conditional UPDATE clause, UPDATE . . . WHERE (D_STORE_STATE='CA'), is satisfied. If it is satisfied, then the matched or corresponding destination record is updated, temporarily, such as in a private local memory.

Based on this temporary updated state of the matched destination record, it is determined whether the conditional DELETE clause, DELETE WHERE (D_PARTS_STATUS='Received'), is satisfied. If it is satisfied, then the appropriate default UPDATE operation is not performed. Thus, the temporarily updated destination record is not saved in shared memory, such as a buffer cache, or in persistent memory, such as a storage disk. The original destination record, which was retrieved from the persistent storage, is queued for deletion from the persistent storage and ultimately deleted therefrom. As a result of this process, an additional scan of the destination table is not necessary to perform the DELETE operation, as would be necessary with prior approaches.

If the conditional UPDATE clause is not satisfied, then the default UPDATE operation is not performed, not even temporarily. Hence, unnecessary processing is foregone. Furthermore, additional flexibility is provided to a database user with respect to application of a MERGE operation.

Continuing with the example, if a matching record is not found, then the INSERT operation is the applicable default operation. It is determined whether the conditional INSERT clause, INSERT . . . WHERE (S_SALES_AMT=>100), is satisfied. If it is satisfied, then a destination record that corresponds to the particular source record is created and inserted into the destination. For example, a row is inserted into a destination table. Ultimately, the new destination record is saved in persistent memory.

If the conditional INSERT clause is not satisfied, then the default INSERT operation is not performed. Hence, additional flexibility is provided to a database user with respect to application of a MERGE operation.

IMPLEMENTATION MECHANISM-HARDWARE OVERVIEW

Figure 3:
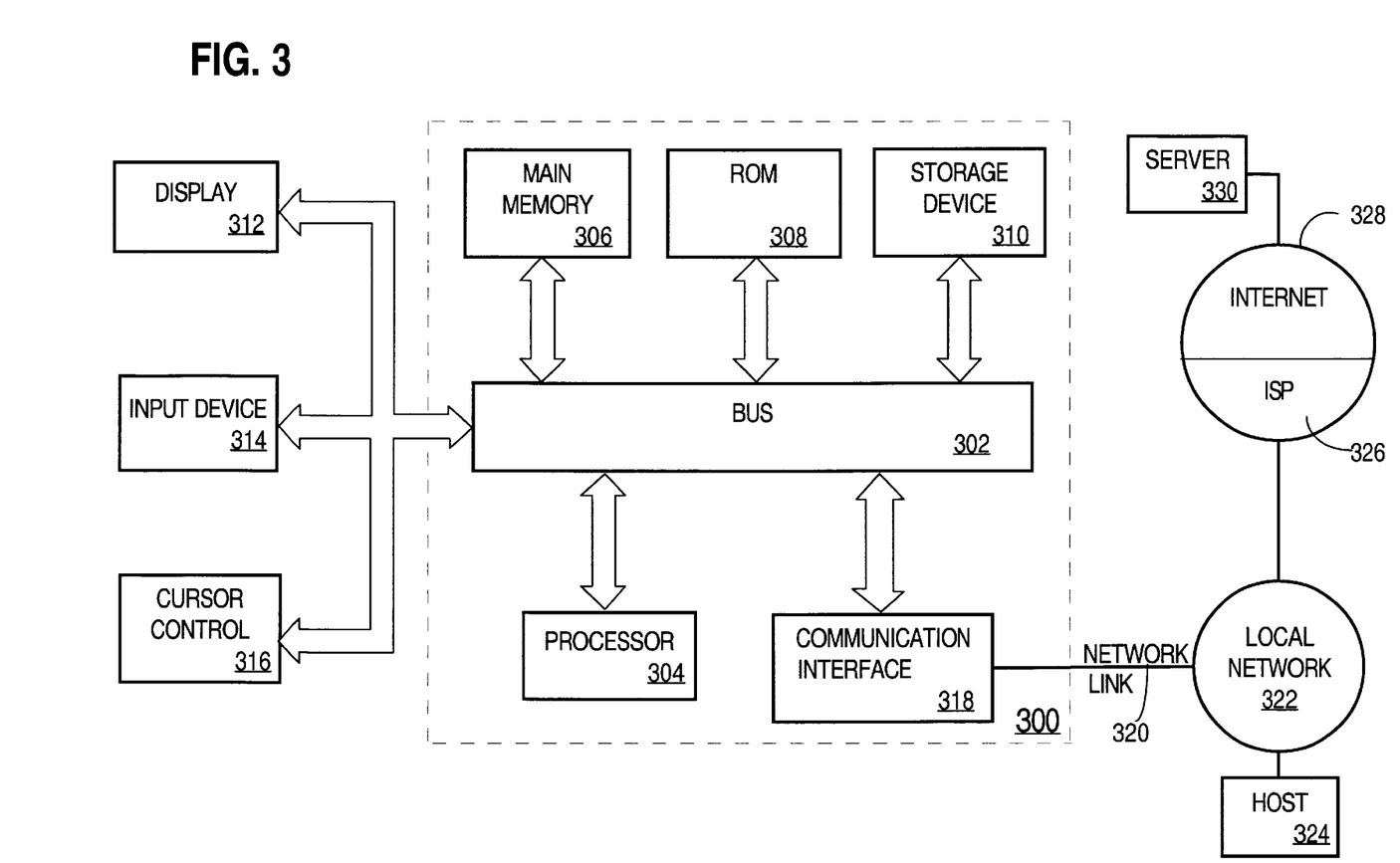
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, DVD, any other optical or magneto-optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for performing a merge operation for merging data from a source to a destination, wherein the merge operation involves performing a default operation for each source record, wherein the default operation performed for each source record is based on whether any destination record corresponds to the source record, the method comprising the computer-implemented steps of:

determining whether a condition is satisfied;

if the condition is satisfied, then performing the default operation appropriate for a particular source record; and if the condition is not satisfied, then processing the particular source record without performing the appropriate default operation.

2. The method of claim 1, wherein the step of determining whether the condition is satisfied is based on at least one of the particular source record and a corresponding destination record.

3. The method of claim 1, wherein no destination record corresponds to the particular source record and wherein the condition is associated with the particular source record, and wherein if the condition is satisfied, then inserting a corresponding destination record into the destination according to the appropriate default operation; and if the condition is not satisfied, then not inserting a corresponding destination record into the destination.

4. The method of claim 1, wherein a destination record corresponds to the particular source record, and wherein if the condition is satisfied, then updating the corresponding destination record in the destination according to the appropriate default operation; and if the condition is not satisfied, then not updating the corresponding destination record in the destination.

5. The method of claim 1, wherein a destination record corresponds to the particular source record, further comprising the computer-implemented steps of:

determining whether a second condition is satisfied;

if the second condition is satisfied, then not updating the corresponding destination record according to the appropriate default operation; and if the second condition is not satisfied, then updating the corresponding destination record according to the appropriate default operation.

6. The method of claim 5, further comprising the step of:

if the second condition is satisfied, then deleting the corresponding destination record.

7. The method of claim 5, wherein the step of determining whether the second condition is satisfied includes updating the corresponding destination record in local memory based on the particular source record; and determining whether the second condition is satisfied based on the updated corresponding destination record in the local memory.

8. The method of claim 1, wherein the condition is specified in a query.

9. The method of claim 1, wherein the step of determining whether a condition is satisfied includes retrieving destination records from persistent storage;

temporarily storing the retrieved destination records in a buffer cache;

temporarily storing source records in the buffer cache; and determining whether the condition is satisfied based on the records in the buffer cache.

10. The method of claim 9, wherein the step of performing the default operation for a particular source record includes storing a corresponding destination record in persistent storage.

11. A computer-readable medium carrying one or more sequences of instructions which, when executed by one or more processors, causes the one or more processors to perform the method recited in claim 1.

12. A computer-readable medium carrying one or more sequences of instructions which, when executed by one or more processors, causes the one or more processors to perform the method recited in claim 2.

13. A computer-readable medium carrying one or more sequences of instructions which, when executed by one or more processors, causes the one or more processors to perform the method recited in claim 3.

14. A computer-readable medium carrying one or more sequences of instructions which, when executed by one or more processors, causes the one or more processors to perform the method recited in claim 4.

15. A computer-readable medium carrying one or more sequences of instructions which, when executed by one or more processors, causes the one or more processors to perform the method recited in claim 5.

16. A computer-readable medium carrying one or more sequences of instructions which, when executed by one or more processors, causes the one or more processors to perform the method recited in claim 6.

17. A computer-readable medium carrying one or more sequences of instructions which, when executed by one or more processors, causes the one or more processors to perform the method recited in claim 7.

18. A computer-readable medium carrying one or more sequences of instructions which, when executed by one or more processors, causes the one or more processors to perform the method recited in claim 8.

19. A computer-readable medium carrying one or more sequences of instructions which, when executed by one or more processors, causes the one or more processors to perform the method recited in claim 9.

20. A computer-readable medium carrying one or more sequences of instructions which, when executed by one or more processors, causes the one or more processors to perform the method recited in claim 10.

21. A method for merging data from a source to a destination, the method comprising the computer-implemented steps of:

receiving a query that specifies a merging of data from the source to the destination; in a local memory, updating a destination record according to the query and based on a corresponding source record;

determining whether a condition associated with the updated destination record is satisfied; and if the condition is satisfied, then deleting from persistent memory a record that corresponds to the destination record.

22. The method of claim 21, further comprising the computer-implemented step of:

if the condition is not satisfied, then saving the updated destination record in persistent memory.

23. The method of claim 21, wherein the step of deleting from persistent memory the record that corresponds to the destination record is performed without updating in persistent memory the record that corresponds to the destination record.

24. The method of claim 21, wherein the query further specifies a condition that is associated with an update operation that is associated with the merging of data, and wherein the method further comprises the computer-implemented steps of:

prior to the step of updating the destination record, determining that the condition associated with the update operation is satisfied.

25. The method of claim 24, wherein the condition that is associated with the update operation is related to the corresponding source record.

26. The method of claim 24, wherein the condition that is associated with the update operation is related to the destination record.

27. A computer-readable medium carrying one or more sequences of instructions which, when executed by one or more processors, causes the one or more processors to perform the method recited in claim 21.

28. A computer-readable medium carrying one or more sequences of instructions which, when executed by one or more processors, causes the one or more processors to perform the method recited in claim 22.

29. A computer-readable medium carrying one or more sequences of instructions which, when executed by one or more processors, causes the one or more processors to perform the method recited in claim 23.

30. A computer-readable medium carrying one or more sequences of instructions which, when executed by one or more processors, causes the one or more processors to perform the method recited in claim 24.

31. A computer-readable medium carrying one or more sequences of instructions which, when executed by one or more processors, causes the one or more processors to perform the method recited in claim 25.

32. A computer-readable medium carrying one or more sequences of instructions which, when executed by one or more processors, causes the one or more processors to perform the method recited in claim 26.

33. A computer apparatus for performing a merge operation for merging data from a source to a destination, wherein the merge operation involves performing a default operation for each source record, wherein the default operation performed for each source record is based on whether any destination record corresponds to the source record, the apparatus comprising:

means for determining whether a specified condition is satisfied;

means for performing the default operation appropriate for a particular source record if the condition is satisfied; and means for processing the particular source record without performing the appropriate default operation if the condition is not satisfied.

34. An apparatus for merging data from a source to a destination, the apparatus comprising:

means for receiving a query that specifies a merging of data from the source to the destination;

means for updating, in a local memory, a destination record according to the query and based on a corresponding source record;

means for determining whether a condition associated with the updated destination record is satisfied; and means for deleting from persistent memory a record that corresponds to the destination record if the condition is satisfied.

* * * * *